United States Patent
Yueh (10) Patent No.: US 9,002,800 B1
(45) Date of Patent: Apr. 7, 2015

(54) ARCHIVE AND BACKUP VIRTUALIZATION

(75) Inventor: Jedidiah Yueh, Irvine, CA (US)

(73) Assignee: EMC Corporation, Hopkinton, MA (US)

( * ) Notice: Subject to any disclaimer, the term of this patent is extended or adjusted under 35 U.S.C. 154(b) by 1296 days.

(21) Appl. No.: 11/772,182

(22) Filed: Jun. 30, 2007

(51) Int. Cl.
*G06F 17/30* (2006.01)
*G06F 12/14* (2006.01)

(52) U.S. Cl.
CPC .................................. *G06F 12/145* (2013.01)

(58) Field of Classification Search
USPC .......................................... 707/609/640/661
See application file for complete search history.

(56) References Cited

U.S. PATENT DOCUMENTS

| | | | |
|---|---|---|---|
| 7,472,242 B1 * | 12/2008 | Deshmukh et al. | 711/162 |
| 7,680,998 B1 * | 3/2010 | Auchmoody et al. | 711/162 |
| 2007/0250674 A1 * | 10/2007 | Fineberg et al. | 711/162 |
| 2008/0034268 A1 * | 2/2008 | Dodd et al. | 714/755 |
| 2008/0133561 A1 * | 6/2008 | Dubnicki et al. | 707/101 |

* cited by examiner

*Primary Examiner* — Hosain Alam
*Assistant Examiner* — Johnese Johnson
(74) *Attorney, Agent, or Firm* — Workman Nydegger (57) ABSTRACT

A data storage and protection system includes secondary storage and at least one instance of a high efficiency storage application ("HESA"). The HESA backs up and archives client data stored in primary storage of a client computer system or client node to secondary storage. Archive files generated by the HESA re-use previously backed up client data stored in the secondary storage. In one embodiment, previously backed up client data is re-used for an archive file by organizing the archive file as a hash tree having hash values pointing to the previously backed up client data. In addition, the HESA can maximize available space in the primary storage by replacing previously backed up and/or archived client data in the primary storage with pointers that point to the previously backed up and/or archived client data in secondary storage.

20 Claims, 5 Drawing Sheets

ARCHIVE AND BACKUP VIRTUALIZATION

CROSS-REFERENCE TO RELATED APPLICATIONS

Not applicable.

BACKGROUND OF THE INVENTION

1. The Field of the Invention

The present invention relates to data storage and backup solutions for archiving data. More particularly, embodiments of the invention relate to software, hardware, systems, and methods for providing an integrated archive and backup solution in a data storage system.

2. The Relevant Technology

The need for reliable backup and archiving of information is well known. Businesses are devoting large amounts of time and money toward information system resources that are devoted to providing backup and archive of information resident in computers and servers within their organizations that produce and rely upon digital information. The customers of the data storage industry are more frequently demanding that not only is their data properly backed up and archived but also that such data protection be done in a cost effective manner with a reduced cost per bit for stored data sets.

To address these demands, Content Addressed Storage ("CAS") has been developed to provide a more cost effective approach to data backup and archiving in data storage and protection systems. CAS assigns an identifier to the data so that it can be accessed no matter where it is located. For example, a hash value may be assigned to each portion or subset of a data set that is to be data protected or backed up. Presently, CAS applications are provided in distributed or networked storage systems designed for CAS, and storage applications use CAS programming interface (API) or the like to store and locate CAS-based files in the distributed system or network.

The use of CAS enables data storage and protection systems to store, online, multi-year archives of data by removing storage of redundant data because complete copies of data sets do not have to be stored as long as that content is stored and available. When used for backup, CAS removes the challenges of maintaining a centralized backup index and also provides a high level of data integrity. CAS-based backup and archive applications have also improved the usage network and data storage resources with better distribution of data throughout a multi-node data storage system.

With CAS, the storage address for any data element or content is generated by an analysis of the contents of the data set itself. Since an exclusive storage address is generated for each unique data element (which is matched with a unique identifier) and the storage address points to the location for the data element, CAS-based architectures have found favor in the storage industry because they reduce the volume of data stored as each unique data object is stored only once within the data storage system.

While providing higher efficiency data storage, current CAS-based data storage systems are typically implemented in conjunction with separate backup and archive applications. Consequently, separate infrastructures are typically provided for the backup solution and the archiving solution, which may include a backup server backing up files to tape or other storage, and a separate archive for long term storage, as well as separate backup and archiving applications. Further, while backup data can be re-used for subsequent backups and archive data can be re-used for subsequent archiving, backup data cannot be re-used for subsequent archiving, often resulting in redundant data between the backups and archives. Accordingly, current data storage systems can be improved by integrating backup and archive solutions and re-using data between backups and archives.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF THE PREFERRED EMBODIMENTS

Reference will now be made to the drawings to describe various aspects of exemplary embodiments of the invention. It should be understood that the drawings are diagrammatic and schematic representations of such exemplary embodiments and, accordingly, are not limiting of the scope of the present invention, nor are the drawings necessarily drawn to scale.

Embodiments of the invention are directed to methods and systems for integrating backup and archiving solutions and reducing redundant data in a data storage system by re-using backup data for archiving. Briefly, embodiments of the invention involve storing client data in primary storage of a client system (e.g., a client computer system or a client node) and backing up and archiving the client data in secondary storage. A high efficiency storage application ("HESA") generates a backup file of the client data and stores the backup file in the secondary storage. Client data previously stored to secondary storage during previous backups is not re-stored during the current backup while new or modified client data is stored in the secondary storage during the current backup. All of the client data backed up during the current backup, including the previously stored client data and not previously stored client data, can be represented using a backup file hash tree.

In a similar manner, the HESA generates archive files for client data in primary storage that is inactive. Previously backed up and stored client data in secondary storage can be re-used in an archive file by representing the archive file as a hash tree with hash values pointing to the corresponding client data already in secondary storage. Once an archive file has been archived in secondary storage, the corresponding inactive client data can be deleted from the primary storage.

In one embodiment, the pointers are retained and can be used as if the secondary storage were primary storage. Alternately or additionally, the HESA can free up space in the primary storage by deleting other client data in primary storage that has already been backed up to secondary storage. In this case, pointers can be stored in the primary storage that point to the other client data in secondary storage.

To practice the invention, the client system, HESA, and storage may be any devices or modules useful for providing the described functions, including well-known data processing and storage and communication devices and systems such as computer devices typically used as hosts in user systems with processing, memory, and input/output components, and server devices configured to maintain and then transmit digital data over a communications network. Data typically is communicated in digital format following standard communication and transfer protocols. The data storage resources are generally described as disk, optical, and tape devices that implement RAID and other storage techniques and that may use SCSI and other I/O, data transfer, and storage protocols, but the invention is not intended to be limited to the example embodiments or to specific hardware and storage mechanisms as it is useful for nearly any data storage arrangement in which backups and archives of digital data are generated and maintained.

Figure 1:
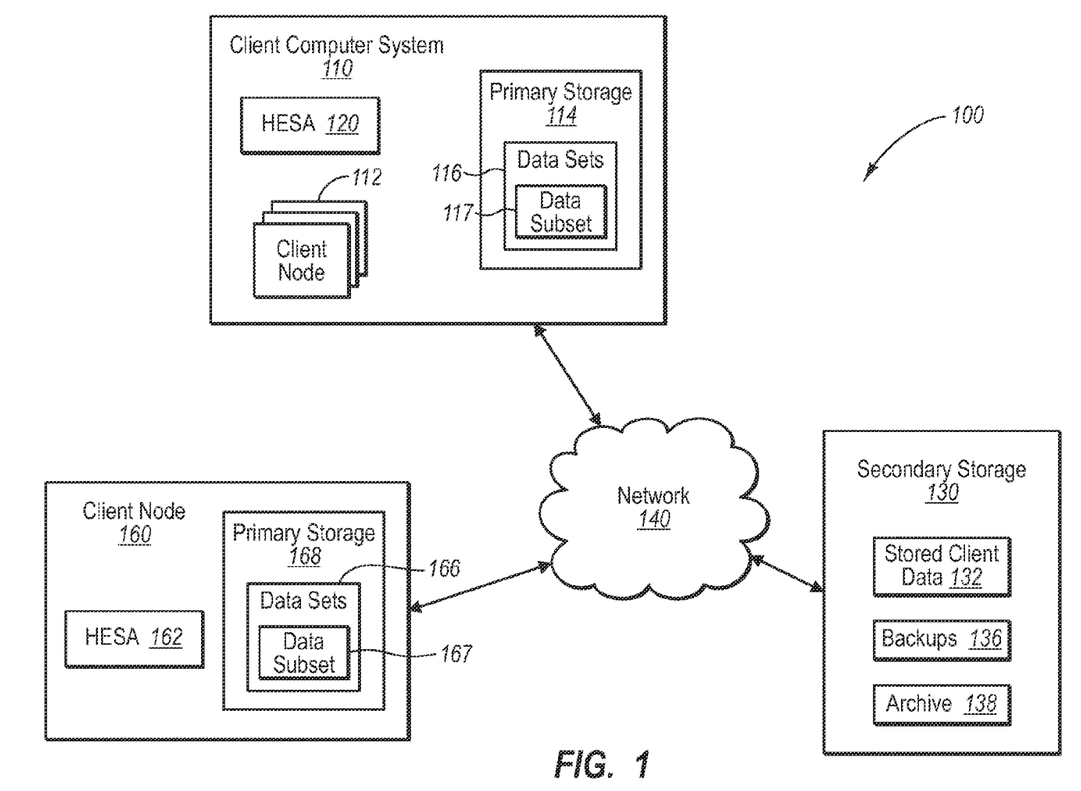
FIG. 1 depicts one embodiment of a data storage and protection system having an integrated backup and archive solution and in which embodiments of the invention can be implemented.

With reference now to FIG. 1, a data storage (or data protection) system 100 is illustrated in which embodiments of the invention may be implemented. The system 100 is shown in simplified or example form and is intended to represent a distributed network of computer systems/devices that generate digital data that is protected with copies stored in an integrated archive and backup file system. As shown, the system 100 includes a client computer system 110 (such as a networked enterprise system, a data center, or the like) in which a plurality of client nodes 112 such as desktops, laptops, portable computing devices, and/or other computer workstations are running one or more applications. The client nodes 112 generate data that is shown to be stored in primary storage 114 as data sets or client data 116.

The data sets 116 can include data previously backed up and stored in a secondary storage 130 as well as new or modified data that has not previously been backed up or stored in secondary storage 130. Within the client data 116, there may be a group of active data sets (e.g., data sets that have been "touched" by a client node application within a certain period of time), inactive data sets (e.g., data sets that have not been "touched" by a client node application within a certain period of time), and a set of key data sets (e.g., data sets that are or may be needed for operation of the client computer system 110, its nodes 112, and/or for business purposes associated with the client computer system 110).

In the client system 110 a high efficiency storage application ("HESA") 120 is provided for performing backup and archiving operations on the data sets 116 and may also be used to recover the data sets in the event of data loss. Backup operations include the generation of backup files, which can generally be described as periodic images of the client data 116 that can be used to restore the client nodes 112 when recovery is required, e.g., when a loss of data occurs. Archive operations include the generation of archive files, which are files that are retained long-term for, e.g., regulatory compliance and/or business purposes.

In the present embodiment, the HESA 120 communicates over a network 140 (e.g., a LAN, a WAN, the Internet, or other wired and/or wireless digital communications networks) with secondary storage 130 to backup and archive client data 116 at 132. The secondary storage can take many forms such as disk storage, holographic systems, tape storage, other memory mechanisms, and combinations of such mechanisms that are useful for storing large amounts of digital information. Additionally, the secondary storage 130 may include an instance of the HESA 120. Further, the secondary storage 130 may exist independently as shown, and/or be integrated with a backup and archive server. In the present embodiment of the invention, the secondary storage 130 comprises content addressed storage ("CAS").

The system 100 may additionally include a standalone or remote client node 160 that is linked to the network 140 and includes an instance of a HESA 162. The HESA 162 can be used in conjunction with the secondary storage 130 to provide backup and archiving of data sets 166 stored in primary storage 168 of the client node 160.

In one embodiment of the invention, the HESA 120, 162 controls the size of the backup and archive client data 132 such as by storing limited copies of data objects or atomics and/or changes to stored content. For example, the HESA 120, 162 may be a hash file system ("HFS") application. Various embodiments of example HFS systems and related methods are disclosed in commonly assigned U.S. Pat. No. 6,704,730 (the '730 patent) and commonly assigned U.S. Pat. No. 6,810,398 (the '398 patent), both of which are incorporated herein by reference in their entirety.

Figure 2:
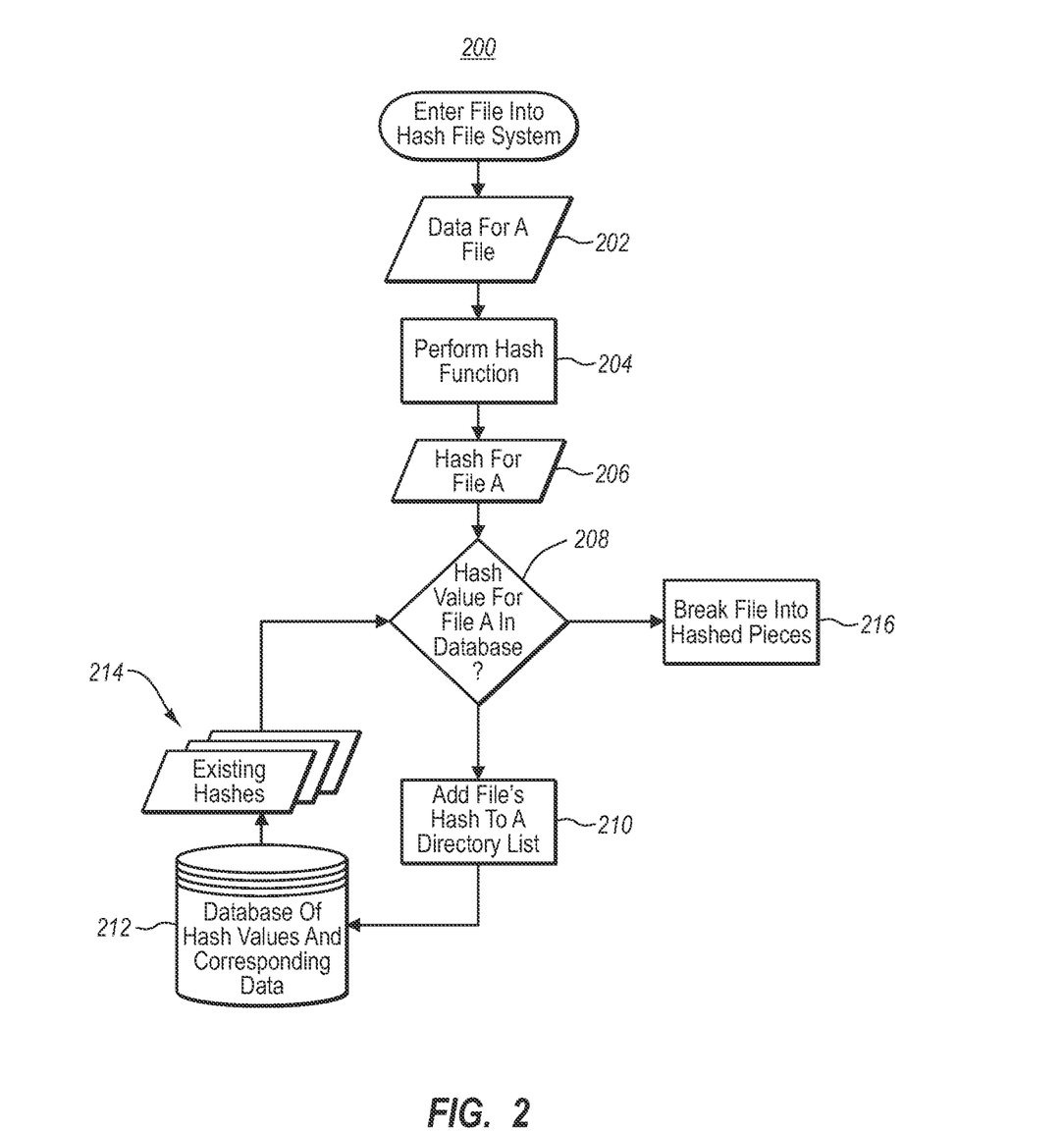
FIG. 2 illustrates a flow chart depicting one embodiment of a method for entering a computer file in to the secondary storage of FIG. 1.

With reference additionally now to FIG. 2, a logic flow chart is shown depicting the process 200 of entry of a computer file into the secondary storage 130. The computer file may be generated by a user on a client node or on a remote client, for example, and may correspond to the client data 116 or 166. Any digital sequence could also be entered into the secondary storage 130 in the present embodiment in much the same way, but the current example wherein the digital sequence entered consists of a computer file is instructive.

In the present embodiment, the process 200 is performed by the client-side HESA 120, 162, although variations of the process may alternately or additionally be performed by a server-side HESA on the secondary storage 130 or on a backup and archive server configured to manage backed up and archived client data in secondary storage 130. The process 200 begins after a computer file 202 ("File A") is received by a HESA from the client computer system 110 or client node 160. The HESA performs 204 a hash function on File A and the resulting hash value (also referred to as a "hash" or "content hash") 206 of File A is compared 208 to the contents of a database 212 containing hash file values. In one embodiment of the invention, the database 212 may be stored in the secondary storage 130. In another embodiment, the HESA 120, 162 may compare the resulting hash value to a locally stored cache of hash file values previously entered into the secondary storage 130 and/or query a HESA running on the secondary storage or on a backup and archive server to compare the hash value to the contents of the database 212.

If the hash value 206 of File A is already in the database (or cache), then the file's hash value is added 210 to a hash recipe. This hash recipe includes, in one embodiment, the data and associated structures needed to reconstruct a file, directory, volume, or entire system depending on the class of computer file data entered into the system. The contents of the database 212 (or cache) comprising hash values and corresponding data is provided in the form of existing hash values 214 for the comparison operation of decision step 208. On the other hand, if the hash value 206 for File A is not currently in the database, at step 216 the file is broken into pieces, each piece is hashed, and the pieces, hashes of each piece, and hash value 206 for File A are stored in the database 212, if not already stored therein. A record may be generated containing the hash of File A as well as the hash of the pieces of File A, as illustrated in FIG. 3.

In one embodiment, the file may be broken into pieces at step 216 according to the sticky byte algorithm disclosed in the '398 patent referenced hereinabove, although other algorithms can also be used. In essence, the sticky byte algorithm divides data into pieces based on commonality with other pieces in the system or the likelihood of pieces being found to be in common in the future.

Figure 3:
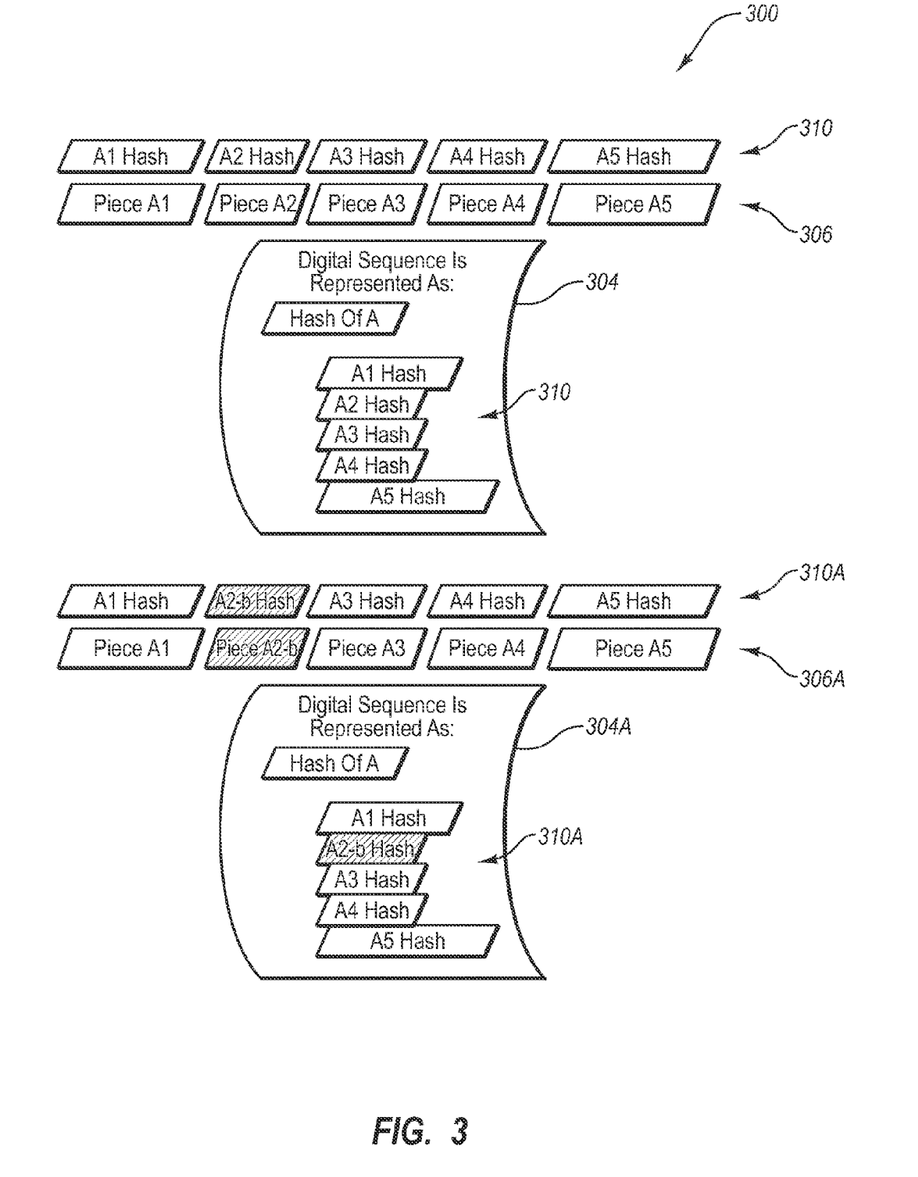
FIG. 3 includes a diagram comparing pieces of a computer file before and after an edit of the computer file.

With reference additionally now to FIG. 3, a comparison 300 of the pieces 306 of the representative computer File A with their corresponding hash values 310 is shown both before and after editing of a particular piece of the file. In this example, the record 304 contains the hash value of File A as well as the hash values 310 of each of the pieces of the file A1 through A5. A representative edit or modification of the File A may produce a change in the data for piece A2 (now represented by A2-b) of the file pieces 306A along with a corresponding change in the hash value A2-b of the hash values 310A. The edited file piece now produces an updated record 304A that includes the modified hash value of File A and the modified hash value of piece A2-b. Accordingly, if File A has previously been entered into the database 212, modified File A can be entered into the database by simply adding the new piece A2-b to the database in addition to the updated record 304A.

Figure 4:
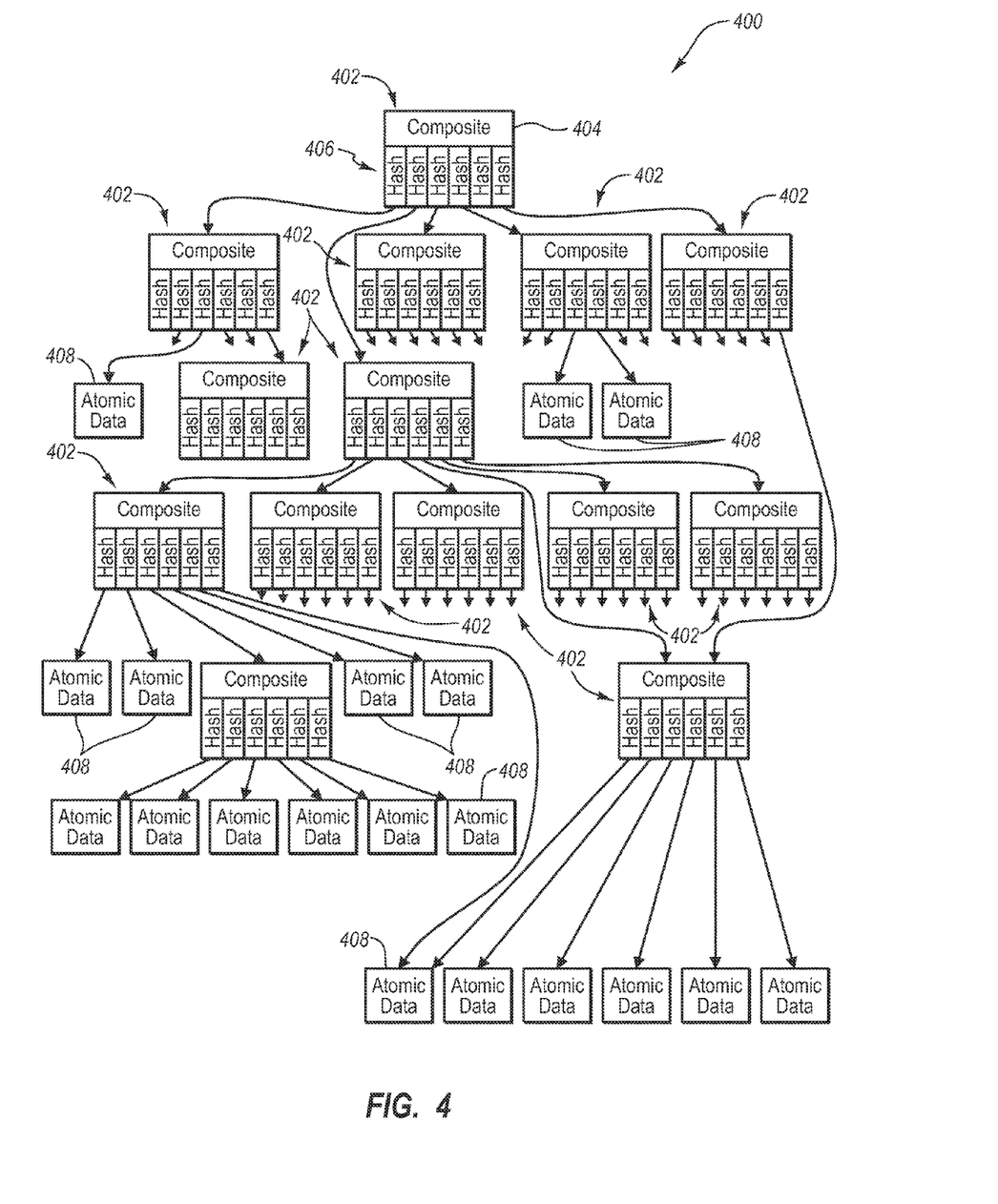
FIG. 4 conceptually represents one embodiment of a hash tree organization which may correspond to a backup or archive file.

With reference additionally now to FIG. 4, a conceptual representation 400 is shown of how a hash file system and method may be utilized to organize data 402 to optimize the reutilization of redundant sequences through the use of hash values 406 as pointers to the data they represent and wherein data 402 may be represented either as explicit byte sequences (atomic data) 408 or as groups of sequences (composites) 404.

The representation 400 illustrates the tremendous commonality of recipes and data that gets reused at every level. The basic structure of the hash file system of the present embodiment is essentially that of a "tree" or "bush" wherein the hash values 406 are used instead of conventional pointers. The hash values 406 are used in the recipes to point to the data or another hash value that could also itself be a recipe. In essence, then, recipes can point to other recipes that point to still other recipes that ultimately point to some specific data, eventually getting down to nothing but data. Advantageously, backup and archive files can be configured as hash trees that point to data 132 already stored in secondary storage 130, thereby re-using the data 132 between the backup and archive files.

Returning to FIG. 1, the HESA 120 (or a HESA running on the secondary storage 130 or on a backup and archive server) can iterate the process 200 of FIG. 2 over all or a portion of the data 116 to generate a backup file. The backup file may be organized in a hash tree so as to optimize the reutilization of redundant data sequences. In a typical client computer system 110, very little of the data 116 changes from day to day. Thus, a daily backup generated by the HESA 120 may include a hash tree representative of the data 116, with a relatively small number of new/modified raw data pieces that need to be added to the secondary storage 130. According to one embodiment of the invention, the new or modified data pieces are added to the stored client data 132 while the hash tree representative of the backup is stored in a backup directory 136.

While the HESA 120 can be used to generate backup files from data 116 stored in primary storage 114, it can also be used to generate archive files. Generally, archive files are static/unchanged files, data structures, and the like that are retained long-term. For example, certain reports for a business or corporation may need to be retained for several years to comply with state and/or federal regulations. Such reports may be generated at a client node and initially stored in primary storage 114. Once generated, such reports often remain unchanged and/or static and there is no need to access them, or they are accessed infrequently. To free up space in primary storage, such reports can be migrated to the secondary storage 130.

Accordingly, the HESA 120 can generate archive files and send them to the secondary storage 130. In one embodiment, the HESA 120 generates archive files for any and all files, data structures, and the like, that have remained inactive in primary storage 114 for a user-defined or default period of time. Alternately or additionally, the HESA 120 can implement user defined and/or default policies to identify particular files, data structures, and the like, that require archiving. In order to reduce the amount of data stored in secondary storage 130, the HESA 120 can generate archive files according to the HFS methods and systems already described. Thus, in the present embodiment, archive files generated by the HESA 120 can be represented by hash trees, similar to backup files, and may additionally include new and/or modified data pieces, if any, not previously stored in the storage 130. The hash trees of each archive file can be stored in the archive directory 138 while any new and/or modified data pieces not previously stored in storage 130 can be added to the client data 132. Once an archive file has been stored in storage 130, the corresponding data can then be deleted from the primary storage 114 to free up space thereon.

Advantageously, the embodiment illustrated in FIG. 1 reuses client data between backup files and archive files, thereby reducing redundant data that can result from implementing separate backup and archive solutions. The embodiment of the invention illustrated in FIG. 1 further provides an integrated backup and archiving solution that requires, by way of example only, half the infrastructure required by conventional data storage and protection systems that include one infrastructure for backup and a separate infrastructure for archiving. Additionally, a single high efficiency storage application can be implemented on a client computer system to provide backup, recovery, and archiving, rather than one application for providing backup and recovery and a separate application for providing archiving, as required in conventional systems.

Note that the invention contemplates implementing the HESA 120 as a client-side application and/or as a server-side application (e.g., running on secondary storage 130 or on a backup/archive server). Accordingly, the invention may be implemented in systems where redundant data is eliminated from a backup/archive file either at the client prior to being sent to storage or at the storage/server. Both implementations can be used to reduce/eliminate redundant data in storage 130. However, the first implementation may be optimized for reducing network traffic while the second implementation may be optimized for offloading processing overhead from the client computer system. One skilled in the art will appreciate that a particular implementation can be chosen according to the requirements and goals of a particular system and system user.

In another embodiment of the invention, data previously backed up to the secondary storage 130 can be replaced with stubs or pointers to the corresponding data in storage 130 to maximize the primary storage 114. Note that after an archive file is created, the corresponding inactive data in primary storage can be deleted to free up primary storage 114. In another embodiment active and/or key data is alternately or additionally removed from primary storage and replaced with stubs or pointers. In one embodiment, the pointers comprise hash values obtained by the HESA 120 performing a hash function on pieces of the raw data 116. In the present embodiment and others discussed herein, the hash functions performed generate unique or probabilistically unique hash values. Accordingly, hash values can be used to point to particular pieces of data. Further, because hash values are typically smaller than the corresponding pieces of data they represent, replacing pieces of data in the primary storage with pointers to the data in secondary storage 130 frees up space in primary storage 114 and reduces redundant data in data storage system 100.

For example, assume data subset 117 within primary storage 114 and data subset 167 within primary storage 168 have previously been backed up in storage 130. Most of the storage space occupied by data subsets 117 and 167 can be freed up by replacing the data subsets 117, 167 with pointers to the corresponding stored client data 132. The HESA 120 may determine to replace the data subset 117 with pointers based on, for example, a low likelihood of the data subset 117 being accessed by the client computer system 110. Advantageously, this embodiment enables re-use of data between backup files, archive files, and primary storage. Further, this embodiment frees up space in the primary storage 114, 168 for additional active data.

In another embodiment of the invention, the HESA 120 can generate an archive file for data, such as the data subset 117, that has previously been replaced by pointers comprising hash values. According to this embodiment, the HESA 120 can copy the pointers and use the pointer copies in generating an archive file hash tree, without first having to perform a hash function on the corresponding raw data.

Figure 5:
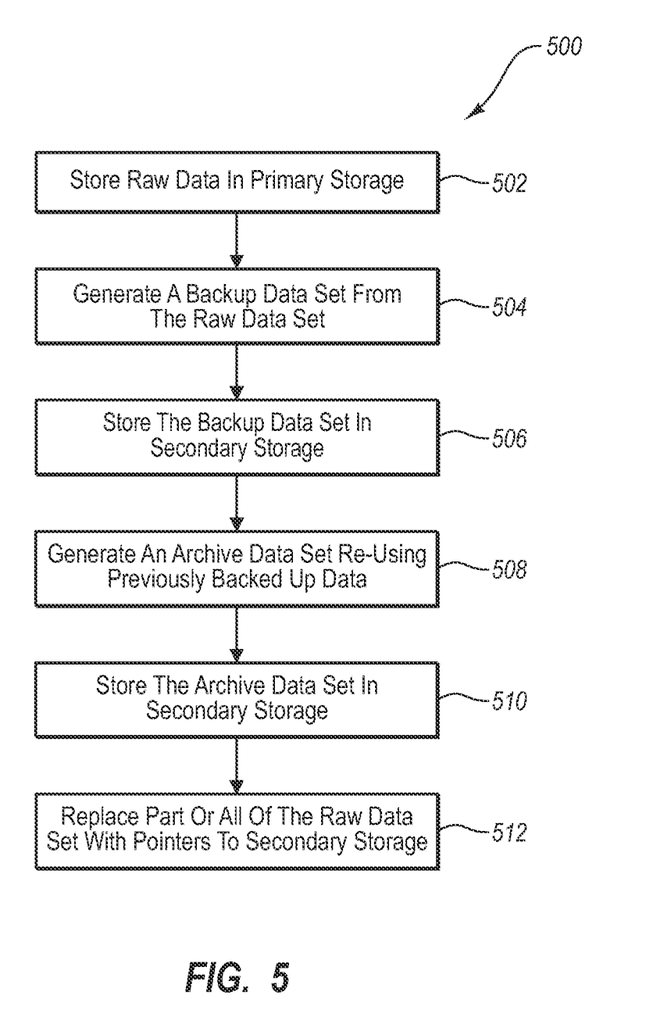
FIG. 5 illustrates one embodiment of a method for providing data protection using an integrated backup and archive solution.

Referring additionally to FIG. 5, one embodiment of a method 500 is illustrated for providing data protection. The method 500 may be implemented in many different computer architectures in which an integrated backup and archiving solution is provided. The method 500 begins after a high efficiency storage application or other integrated backup and archiving solution is provided on a computer architecture. The computer architecture may comprise the data storage system of FIG. 1, for example, wherein raw data sets 116 are stored 502 in primary storage. As used herein, "raw data" refers to the actual digital data as initially stored in primary storage, as opposed to a pointer to the data, for instance.

The HESA 120 generates 504 a backup file or backup data set from the raw data set. As described above, the backup file may be a de-duplicated backup including a hash tree representative of the raw data set (or a portion thereof) and new and/or modified pieces of raw data not previously stored in storage 130. Thus, embodiments of the invention include de-duplication elements. For instance, generating the backup using a hash tree representation enables data to be de-duplicated. After generating the backup data set, the HESA 120 stores 506 the backup data set in the secondary storage 130. Storing the backup file in the secondary storage includes, in one embodiment, sending the backup file to the storage 130 or to a backup and archive server that manages the storage 130.

The HESA 120 additionally generates 508 and stores 510 an archive file or archive data set from at least a portion of the raw data set. In one embodiment, the archive file is a de-duplicated archive file including a hash tree representative of the raw data set (or a portion thereof) and any new and/or modified pieces of raw data not previously stored in storage 130. Advantageously, raw data previously stored in storage 130 during a backup can be re-used by referencing it with hash values in the hash tree of the archive file, thereby reducing the total amount of data 132 stored for archives and backups.

Finally, the HESA 120 can replace 512 part or all of the raw data set 116 with pointers to the backed up/archived data 132 in secondary storage 130, to thereby free up space in the primary storage 114. Stated another way, the HESA 120 can delete part or all of the data set 116 from primary storage 114 and store in its place stubs or pointers that point to the corresponding data in secondary storage 130.

Embodiments within the scope of the present invention include computer-readable media for carrying or having computer-executable instructions or electronic content structures stored thereon, and these terms are defined to extend to any such media or instructions that are used with a general purpose or special purpose computer. By way of example, and not limitation, computer-readable media can comprise RAM, ROM, EEPROM, CD-ROM or other optical disk storage, magnetic disk storage or other magnetic storage devices, or any other medium which can be used to carry or store desired program code in the form of computer-executable instructions or electronic content structures and which can be accessed by a general purpose or special purpose computer, or other computing device.

When information is transferred or provided over a network or another communications connection to a computer or computing device, the computer or computing device properly views the connection as a computer-readable medium. Thus any such a connection is properly termed a computer-readable medium. Combinations of the above should also be included within the scope of computer-readable media. Computer-executable instructions comprise, for example, instructions and content which cause a general purpose computer, special purpose computer, special purpose processing device or computing device to perform a certain function or group of functions.

Although not required, aspects of the invention have been described herein in the general context of computer-executable instructions, such as program modules, being executed by computers in network environments. Generally, program modules include routines, programs, objects, components, and content structures that perform particular tasks or implement particular abstract content types. Computer-executable instructions, associated content structures, and program modules represent examples of program code for executing aspects of the methods disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for providing data protection in a computer architecture including a client computer system and secondary storage, the method comprising:
   integrating a data backup process together with a data archive process, where the data backup process is different from the data archive process, and the integration of the data backup process with the data archive process is performed by:
   creating a de-duplicated backup data set from a raw data set that includes both active and inactive portions stored in primary storage of a client computer system, wherein the de-duplicated backup data set includes part of the active portion of the raw data set;

storing the de-duplicated backup data set in a secondary storage remote from the client computer system;

creating a de-duplicated archive data set from at least the inactive portion of the raw data set stored in the primary storage, wherein the archive data set re-uses one or more pieces of raw data currently stored in the secondary storage by referencing the one or more pieces of raw data in the de-duplicated backup data set, the one or more pieces of raw data having been stored in the secondary storage during one or more previous backups; and storing the de-duplicated archive data set in the secondary storage such that at least some of the raw data included in the de-duplicated archive data set is the same raw data included in the de-duplicated backup data set.

2. The method of claim 1, wherein creating the de-duplicated backup data set from the raw data set includes:

breaking the raw data set into one or more pieces;

performing a hash function on each piece; and comparing each resulting hash value to a set of hashes corresponding to pieces of data previously stored in secondary storage.

3. The method of claim 2, wherein creating the de-duplicated backup data set further includes building a hash tree of the raw data set, the hash tree including a plurality of hash values representative of the one or more pieces of the raw data set.

4. The method of claim 3, wherein the de-duplicated backup data set includes the hash tree of the raw data set and one or more pieces of data whose hash values did not match any of the hashes in the set of hashes corresponding to pieces of data previously stored in secondary storage.

5. The method of claim 1, wherein the archive data set re-uses the one or more pieces of raw data currently stored in the secondary storage by pointing to the one or more pieces of raw data with one or more hash values organized in a hash tree representative of the archive data set.

6. The method of claim 1, further comprising, deleting the at least a portion of the raw data set from the primary storage after creating the archive data set.

7. The method of claim 1, wherein the at least a portion of the raw data set from which the archive data set is created comprises a first portion of the raw data set, the method further comprising, replacing a second portion of the raw data stored in primary storage with one or more pointers, wherein the second portion of the raw data set has previously been stored to the secondary storage during one or more prior backups and wherein the one or more pointers point to the second portion of the raw data set in the secondary storage.

8. The method of claim 7, wherein the one or more pointers comprise one or more hash values obtained by performing a hash function on one or more pieces of data of the second portion of the raw data set.

9. A method for reducing redundant data in a data storage system by re-using backup data for archiving, the method comprising:

integrating a data backup process together with a data archive process, where the data backup process is different from the data archive process, and the integration of the data backup process with the data archive process is performed by:

storing client data that includes both active and inactive portions in primary storage of a client system, the client data including data previously backed up and stored in secondary storage and data not previously backed up or stored in secondary storage;

generating a backup file including active data from the active portion of the client data, wherein the backup file includes the not previously backed up or stored client data and a hash tree organization of the client data from which the backup file is generated, the backup file hash tree organization including one or more hash values pointing to one or more corresponding pieces of client data;

storing the backup file in secondary storage;

generating an archive file from at least the inactive portion of the client data stored in primary storage, the archive file including a hash tree organization of the at least the first portion of the client data, wherein the archive file hash tree organization includes one or more hash values pointing to one or more corresponding pieces of client data previously backed up and stored in secondary storage, wherein at least some of the one or more hash values included in the archive file hash tree organization are included in the backup file hash tree organization;

storing the archive file in secondary storage such that at least some of the raw data included in the archive file is the same raw data included in the backup file; and removing the first portion of the client data that is inactive from the primary storage.

10. The method of claim 9, wherein generating the backup file from the client data includes:

breaking the client data into one or more pieces;

performing a hash function on each piece;

comparing each resulting hash value to a plurality of hashes corresponding to pieces of data previously backed up and stored in secondary storage to identify pieces of the client data that are new or modified; and organizing the hash values for all of the pieces of the client data into the backup file hash tree.

11. The method of claim 9, wherein the generating and storing of backup and archive files is performed by:

a high efficiency storage application installed and operating on the client system;

a high efficiency storage application installed and operating on a backup and archive server managing the secondary storage; or two high efficiency storage applications, one each installed and operating on the client system and the backup and archive server.

12. The method of claim 9, further comprising:

deleting a second portion of the client data from primary storage, the second portion of the client data having previously been backed up and stored in secondary storage; and storing a plurality of pointers in the primary storage that point to the second portion of the client data stored in secondary storage.

13. The method of claim 12, wherein the plurality of pointers comprise a plurality of probabilistically unique hash values obtained by hashing a plurality of pieces of data corresponding to the second portion of the client data.

14. The method of claim 12, wherein the first portion of the client data includes the second portion of the client data and wherein generating an archive file from at least a first portion of the client data includes copying the pointers and using the copied pointers in the archive file hash tree organization.

15. A data storage and protection system, comprising:

a computer system that includes a secondary storage, the computer system including a high efficiency storage application configured to integrate a data backup process together with a data archive process, where the data backup process is different from the data archive process, wherein in operation, the high efficiency storage application operates to:

create a de-duplicated backup data set from a raw data set that includes both active and inactive portions stored in primary storage of a client computer system;

store the de-duplicated backup data set in a secondary storage remote from the client computer system;

create a de-duplicated archive data set from at least the inactive portion of the raw data set stored in the primary storage, wherein the de-duplicated archive data set re-uses one or more pieces of raw data currently stored in the secondary storage by referencing the one or more pieces of raw data in the de-duplicated backup data set, the one or more pieces of raw data having been stored in the secondary storage during one or more previous backups; and store the de-duplicated archive data set in the secondary storage, wherein the de-duplicated backup data set and the de-duplicated archive data set are different data sets and are configured to reference some of the same raw data such that at least some of the raw data included in the de-duplicated archive data set is the same raw data included in the de-duplicated backup data set.

16. The data storage and protection system of claim 15, wherein the de-duplicated archive data set re-uses previously backed up raw data by pointing to the previously backed up raw data with one or more hash values organized in a hash tree representative of the de-duplicated archive data set.

17. The data storage and protection system of claim 15, wherein the high efficiency storage application is installed and operating on a client computer system or a client node.

18. The data storage and protection system of claim 17, further comprising a backup and archive server configured to manage the de-duplicated backup data set and the de-duplicated archive data set received in the secondary storage.

19. The data storage and protection system of claim 17, wherein the client computer system or client node includes primary storage for storing active or key data sets.

20. The data storage and protection system of claim 19, wherein at least a portion of the active or key data sets have been backed up in secondary storage and wherein the high efficiency storage application is further configured to delete the at least a portion of the active or key data sets from the primary storage and represent them in the primary storage using one or more pointers that point to the at least a portion of the active or key data sets in secondary storage.

* * * * *